3,052,696
NOVEL 16α-METHYL-Δ⁴,⁹⁽¹¹⁾-PREGNADIENES AND PREPARATION THEREOF

Robert Joly, Montmorency, Julien Warnant, Neuilly-sur-Seine, and Bernard Goffinet, Paris, France, assignors, by mesne assignments, to Roussel-UCLAF, S.A., Paris, France, a corporation of France
No Drawing. Filed Mar. 10, 1961, Ser. No. 94,685
Claims priority, application France Mar. 16, 1960
8 Claims. (Cl. 260—397.45)

This invention relates to novel 16α-methyl-Δ⁴,⁹⁽¹¹⁾-pregnadienes, and particularly to 16α-methyl-Δ⁴,⁹⁽¹¹⁾-pregnadiene-17α-ol-3,20-dione. The invention further relates to a novel process for the preparation of said 16α-methyl-Δ⁴,⁹⁽¹¹⁾-pregnadienes and novel intermediates thereof.

Dexamethasone or hexadecadrol, which represents the most active corticosteroid known today, has been obtained prior to the present invention according to the process described by Arth et al. (J. Am. Chem. Soc., 1958, 80, 3161). The process described by these authors starts from 16α-methyl-pregnane-3α,17α-diol-11,20-dione through a key intermediate, namely 21-acetoxy-16α-methyl-Δ⁴,⁹⁽¹¹⁾-pregnadiene-17α-ol-3,20-dione. The 9,11-fluorohydrin of this product is prepared according to the process of Fried et al. (J. Am. Chem. Soc., 1954, 76, 1455) through the introduction of the 1,2-double bond by microbiologic methods or by the action of selenium dioxide in order to obtain dexamethasone or 9α-fluoro-16α-methyl prednisolone.

The authors of the prior art show the acetoxylation in the 21-position of 16α-methyl-pregnane-3α,17α-diol-11,20-dione as the first step. The protection of the ketonic function in the 20-position through formation of the ketal cannot occur in this circumstance and one is obliged to proceed through the disemicarbazone in the 3- and 20-positions which presents some difficulties due to steric hindrance in the 20-position caused by the acetoxy group and by the presence of the methyl in the 16-position. After reduction of the 11-keto group of the said disemicarbazone to a 11-hydroxy group, the semicarbazone groups are removed by a difficult hydrolysis. During the hydrolysis the 21-acetoxy group is partially saponified and the additional step of reacetylation is required. By forming ethylene ketals instead of disemicarbazones, the hydrolysis step after the reduction of the 11-keto group is easily effected with practically quantitative yields. The process of proceeding from 16α-methyl-pregnane-3α,17α-diol-11,20-dione to the key intermediate, 21-acetoxy-16α-methyl-Δ⁴,⁹⁽¹¹⁾-pregnadiene-17α-ol-3,20-dione, according to the prior art, results in an overall yield of about 25% to 30%.

It is an object of the present invention to obtain the novel steroid, 16α-methyl-Δ⁴,⁹⁽¹¹⁾-pregnadiene-17α-ol-3,20-dione.

It is another object of the invention to provide a novel process for the preparation of 16α-methyl-Δ⁴,⁹⁽¹¹⁾-pregnadiene-17α-ol-3,20-dione.

It is a further object of the invention to obtain the following novel intermediates:

(a) 4-bromo-16α-methyl-pregnane-17α-ol-3,11,20-trione.
(b) 16α-methyl-Δ⁴-pregnene-17α-ol-3,11,20-trione.
(c) 3,20-bis-ethylene dioxy-16α-methyl-Δ⁵-pregnene-17α-ol-11-one.
(d) 3,20-bis-ethylene dioxy-16α-methyl-Δ⁵-pregnene-11β,17α-diol.
(e) 3,20-bis-ethylene dioxy-16α-methyl-Δ⁵,⁹⁽¹¹⁾-pregnadiene-17α-ol.

These and other objects and advantages of the invention will become obvious from the following detailed description.

By preparing 16α-methyl-Δ⁴,⁹⁽¹¹⁾-pregnadiene-17α-ol-3,20-dione starting from 16α-methyl-pregnane-3α,17α-diol-11,20-dione according to the present invention, the key intermediate, 21-acetoxy-16α-methyl-Δ⁴,⁹⁽¹¹⁾-pregnadiene-17α-ol-3,20-dione, can be formed by treating 16α-methyl-Δ⁴,⁹⁽¹¹⁾-pregnadiene-17α-ol-3,20-dione with iodine in the presence of a mixture of calcium chloride and calcium oxide to form 21-diiodo-16α-methyl-Δ⁴,⁹⁽¹¹⁾-pregnadiene-17α-ol-3,20-dione and treating the said 21-diiodo compound with an alkali metal acetate to give the key intermediate. The overall yield starting from 16α-methyl-pregnane-3α-17α-diol-11,20-dione is 40% to 45% compared to the prior art yield of 25% to 30%. The higher yields and the simplified procedures when using the diketal intermediate are very advantageous.

The process of the present invention comprises bromo-oxidating 16α-methyl pregnane-3α,17α-diol-11,20-dione to form 4-bromo-16α-methyl-pregnane-17α-ol-3,11,20-trione, dehydrobrominating said 4-bromo-pregnane to form 16α-methyl-Δ⁴-pregnene-17α-ol-3,11,20-trione, ketalizing the latter to form 3,20-diketal-16α-methyl-Δ⁵-pregnene-17α-ol-11-one, reducing the said diketal to form 3,20-diketal-16α-methyl-Δ⁵-pregnene-11β,17α-diol, dehydrating the latter to form 3,20-diketal 16α-methyl-Δ⁵,⁹⁽¹¹⁾-pregnadiene-17α-ol and hydrolyzing the latter under acidic conditions to form 16α-methyl-Δ⁴,⁹⁽¹¹⁾-pregnadiene-17α-ol-3,20-dione.

A preferred mode of conducting the process of the present invention comprises effecting bromo-oxidation of 16α-methyl-pregnane-3α,17α-diol-11,20-dione with an N-bromo-amide, such as N-bromosuccinimide, in a lower alkanol such as t-butanol to form 4-bromo-16α-methyl-pregnane-17α-ol-3,11,-20-trione, dehydrobrominating said 4-bromo-pregnane with a mixture of lithium bromide and lithium carbonate to form 16α-methyl-Δ⁴-pregnene-17α-ol-3,11,20-trione, ketalizing the latter by reaction with ethylene glycol and p-toluene sulfonic acid to form 3,20-bis-ethylene dioxy-16α-methyl-Δ⁵-pregnene-17α-ol-11-one, reducing the said diketal with an alkali metal borohydride in an inert organic solvent such as tetrahydrofuran at temperatures below room temperature to form 3,20-bis-ethylene dioxy-16α-methyl-Δ⁵-pregnene-11β,17α-diol, dehydrating the latter dissolved in a nitrogen-containing organic solvent such as pyridine or dimethylformamide or mixtures thereof with an alkyl sulfonyl halide at room temperature to form 3,20-bis-ethylene dioxy-16α-methyl-Δ⁵,⁹⁽¹¹⁾-pregnadiene-17α-ol and hydrolyzing the latter in the presence of an organic or inorganic acid such as aqueous acetic acid to form 16α-methyl-Δ⁴,⁹⁽¹¹⁾-pregnadiene-17α-ol-3,20-dione. The process of the invention is illustrated in Table I.

TABLE I

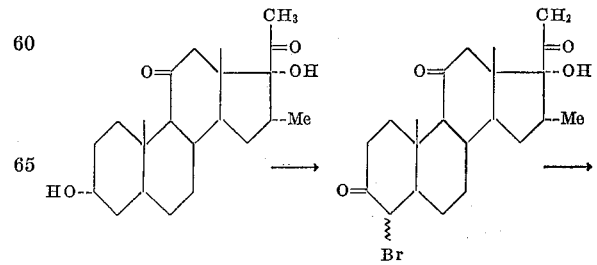

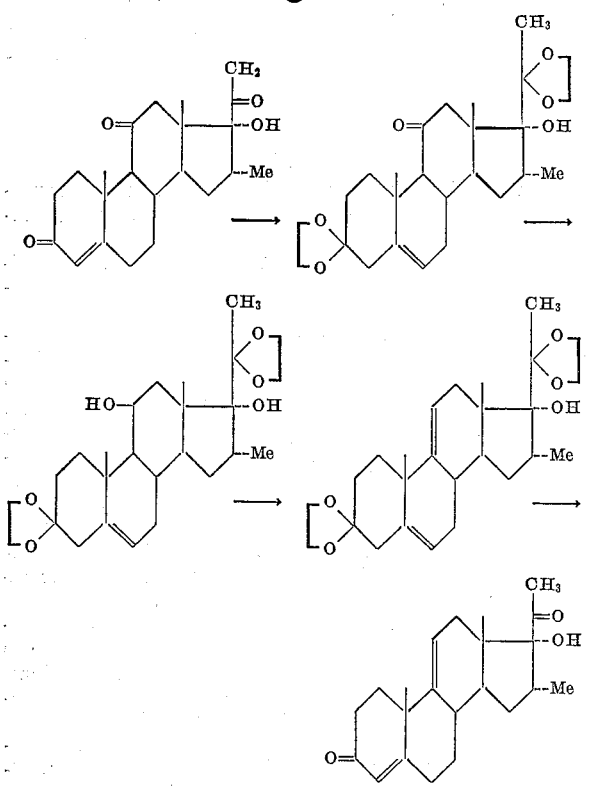

The key intermediate, 21-acetoxy-16α-methyl-Δ4,9(11)-pregnadiene-17α-ol-3,20-dione, can be easily formed by reacting 16α-methyl-Δ4,9(11)-pregnadiene-17α-ol-3,20-dione with iodine in the presence of a mixture of calcium oxide and calcium chloride to form 21-diiodo-16α-methyl-Δ4,9(11)-pregnadiene-17α-ol-3,20-dione and effecting 21-acetoxylation by reacting the latter with an alkali metal acetate. This process is illustrated in Table II.

TABLE II

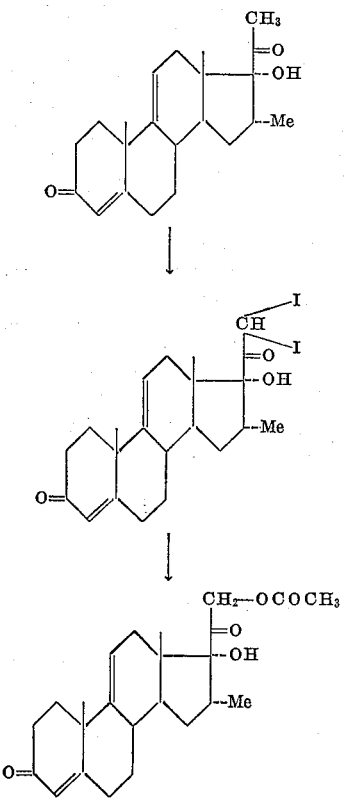

In the following examples there are described several preferred embodiments to illustrate the invention. However, it should be understood that the invention is not intended to be limited to the specific examples.

All melting points in the examples are instantaneous melting points determined on the Maquenne block.

EXAMPLE I

Preparation of 16α-Methyl-Δ4,9(11)-Pregnadiene-17α-ol-3,20-dione

STEP A.—4-BROMO-16α-METHYL-PREGNANE-17α-OL-3,11,20-TRIONE 800 gm. of 16α-methyl-pregnane-3α,17α-diol-11,20-dione were introduced into 6 liters of t-butanol, the compound being prepared according to the process described in the copending, commonly-assigned United States patent application Serial No. 863,120, filled December 31, 1959. The mixture was heated slowly to 40° C., then 864 gm. of N-bromosuccinimide were added and the reaction mixture was agitated at 40° C. for one-half hour. After about twenty minutes an abundant crystal precipitate of 16α-methyl-pregnane-17α-ol-3,11,20-trione was formed. At this point 8 cc. of hydrobromic acid was added and the mixture heated to 60° for one-half hour. A clear, yellow solution was obtained which was poured into water. After allowing to stand overnight, the precipitate which was formed was filtered under vacuum. It was then purified by dissolving in a hot mixture of acetone and acetic acid, adding sodium iodide thereto and precipitating by adding water. 832 gm. (being an 86% yield) of 4-bromo-16α-methyl-pregnane-17α-ol-3,11,20-trione were recovered, having a melting point of 220°±2, and a specific rotation $[\alpha]_D^{20}=+69°$ ($c=1\%$ in chloroform). This product occurred in the form of colorless needles, soluble in chloroform, in the hot in benzene, poorly soluble in alcohol and ether, insoluble in water.

Analysis. — $C_{11}H_{31}O_4Br$; molecular weight=439.39. Calculated: C, 60.13%; H, 7.11%; Br, 18.19%. Found: C, 60.0%; H, 7.1%; Br, 18.5%.

This product is not described in the literature.

STEP B.—16α-METHYL-Δ4-PREGNENE-17α-OL-3,11,20-TRIONE 600 gm. of the compound produced in Step A were introduced in an atmosphere of nitrogen into a mixture of 180 gm. of dry lithium bromide, 300 gm. of dry lithium carbonate and 3600 cc. of dimethyl formamide. The mixture was heated to 95° under agitation for twenty hours. After cooling, it was poured into aqueous acetic acid, vacuum filtered, and the filter cake washed with water and dried in order to recover 481 gm. of 16α-methyl-Δ4-pregnene-17α-ol-3,11,20-trione, having a melting point of 232° C. By recrystallization in ethyl acetate, the pure product was obtained for analysis having a melting point of 233°±2°, and a specific rotation $[\alpha]_D^{20}=+167°$ ($c=1\%$ in chloroform) with a yield of 94%. The compound was in the form of colorless crystals, soluble in chloroform, poorly soluble in alcohol, ether, acetone, benzene, insoluble in water.

Ultra-violet Spectra: $\lambda_{max.}=239m\mu$ (ethanol)=15,500.

Analysis.—$C_{22}H_{34}O_4$; molecular weight=358.46. Calculated: C, 73.71%; H, 8.44%. Found: C, 73.8%; H, 8.4%.

This product is not described in the literature.

STEP C.—3,20-BIS-ETHYLENE DIOXY-16α-METHYL-Δ5-PREGNENE-17α-OL-11-ONE

A mixture of 750 gm. of the compound formed in Step B with 40 liters of benzene, 5.25 liters of ethylene glycol and 35 gm. of p-toluene sulfonic acid was refluxed for twelve hours with separation of the water formed. Then 7.50 liters of an aqueous solution of 2 N sodium carbonate and 30 liters of water were added. The organic layer was separated, washed with water, and dried over anhydrous sodium sulfate. The organic liquid was filtered and the solvent evaporated to dryness under vacuum.

3,20-bis-ethylene dioxy-16α-methyl-Δ⁵-pregnene-17α-ol-11-one was obtained, which was washed by trituration with methanol containing 1% pyridine. The compound was dried and 884 gm. (being a yield of 94.5%) of the product were recovered having a melting point of 261° C. and a specific rotation $[\alpha]_D^{20} = -37°$ ($c=1\%$ in chloroform containing 1% of pyridine).

The product was present in the form of colorless prisms soluble in chloroform, insoluble in water and the usual solvents.

*Analysis.*—$C_{26}H_{38}O_6$; molecular weight=446.58. Calculated: C, 69.92%; H, 8.58%. Found: C, 69.8; H, 8.4%.

This compound is not described in the literature.

STEP D.—3,20-BIS-ETHYLENE DIOXY-16α-METHYL-Δ⁵-PREGNENE-11β,17α-DIOL 1500 gm. of the compound formed in Step D were introduced into 120 liters of tetrahydrofuran. 30 liters of water were added, then the mixture was cooled to 0° C. and 1500 gm. of potassium borohydride were introduced slowly. The reaction mixture was agitated and when the ketone titration fell to below 1%, the tetrahydrofuran was distilled off. 3,20-bis-ethylene dioxy-16α-methyl-Δ⁵-pregnene-11β,17α-diol crystallized spontaneously. 30 liters of water were added to the mixture, which was agitated for one hour and the precipitated product was then vacuum filtered and recrystallized from chloroform containing 1% of pyridine. The product had a melting point of 190° C., and a specific rotation $$[\alpha]_D^{20} = -60°$$

($c=1\%$ in chloroform containing 1% of pyridine). The yield was quantitative. The product was present in the form of colorless crystals, soluble in chloroform, poorly soluble in alcohol and insoluble in ether, water and aqueous dilute acids and alkalis.

*Analysis.*—$C_{26}H_{40}O_6$; molecular weight=448.58. Calculated: C, 69.61%; H, 8.99%; O, 21.40%. Found: C, 69.9%; H, 9.1%; O, 21.2%.

This compound is not described in the literature.

STEP E.—3,20-BIS-ETHYLENE DIOXY-16α-METHYL-Δ⁵,⁹⁽¹¹⁾-PREGNADIENE-17α-OL 1500 gm. of the compound formed in Step D were dissolved in a mixture of 1800 cc. of pyridine and 4500 cc. of dimethylformamide. 750 cc. of methane sulfonyl chloride were then introduced in the space of an hour and one-half. The mixture was then agitated for eighteen hours at room temperature in the absence of light, and the reaction mixture was iced for two hours. The mixture was vacuum filtered, the filter cake recrystallized from dimethylformamide and dried to recover 1340 gm. (being 93% yield) of white product having a melting point of 231° C. and a specific rotation $[\alpha]_D^{20} = -43°$ ($c=1\%$ in chloroform containing 1% of pyridine). The product, 3,20-bis-ethylene dioxy-16α-methyl-Δ⁵,⁹⁽¹¹⁾-pregnadiene-17α-ol, was present in the form of colorless platelets. It was soluble in chloroform, poorly soluble in acetone, benzene, alcohol and ether and insoluble in water and dilute aqueous acids or alkalis.

*Analysis.*—$C_{26}H_{38}O_5$; molecular weight=430.56. Calculated: C, 72.52%; H, 8.90%. Found: C, 72.8%; H, 8.9%.

This product is not described in the literature.

STEP F.—16α-METHYL-Δ⁴,⁹⁽¹¹⁾-PREGNADIENE-17α-OL-3,20-DIONE 1500 gm. of the compound formed in Step E were introduced into a mixture of 7200 cc. of acetic acid and 1800 cc. of water in an atmosphere of nitrogen. The reaction mixture was heated for three hours at 85° C. 12 liters of water were then added. The mixture was iced for one hour and the precipitated product was vacuum filtered. After washing with aqueous acetic acid, the product was dried and 1067 gm. (being a yield of 89.5%) of 16α-methyl-Δ⁴,⁹⁽¹¹⁾-pregnadiene-17α-ol-3,20-dione were recovered melting at 211°. The product was recrystallized in ethyl acetate, then in ethanol and had a melting point of 211° C. and a specific rotation $[\alpha]_D^{20} = +51°$ ($c=1\%$ in chloroform). This compound was present in the form of colorless prisms, soluble in chloroform, poorly soluble in alcohol, ether and acetone and insoluble in water and dilute aqueous acids and alkalis.

*Analysis.*—$C_{22}H_{30}O_3$; molecular weight=342.42. Calculated: C, 77.15%; H, 8.83%. Found: C, 77.0%; H, 8.9%.

This product is not described in the literature.

EXAMPLE II

*Preparation of 21-Acetoxy-16α-Methyl-Δ⁴,⁹⁽¹¹⁾-Pregnadiene-17α-Ol-3,20-Dione*

STEP A.—16α-METHYL-21-DIIODO-Δ⁴,⁹⁽¹¹⁾-PREGNADIENE-17α-OL-3,20-DIONE 1000 gm. of 16α-methyl-Δ⁴,⁹⁽¹¹⁾-pregnadiene-17α-ol-3,20-dione were introduced into a mixture of 4 liters of methanol and 100 cc. of a methanolic solution containing 10% of calcium chloride. The mixture was agitated several minutes, then 200 gm. of quicklime and 800 gm. of calcium hydroxide were added to the suspension formed. A solution was prepared of 1510 gm. of iodine in 2 liters of methanol containing 10% of calcium chloride and diluted with 1 liter of methanol. This solution was then introduced into the mixture containing 16α-methyl-Δ⁴,⁹⁽¹¹⁾-pregnadiene-17α-ol-3,20-dione under agitation and in an atmosphere of nitrogen and in the absence of light. The introduction was effected by addition of small amounts over a space of about one-half hour. An orange-yellow suspension was obtained which did not contain free iodine. This suspension was poured into a mixture of ice and water containing 10% of acetic acid, agitated for one-half hour, then vacuum filtered and the product obtained was washed with water. The product was dried and 1760 gm. of 16α-methyl-21-diiodo-Δ⁴,⁹⁽¹¹⁾-pregnadiene-17α-ol-3,20-dione (being a quantitative yield) were recovered. This product contained 42% of iodine (theory being 42.8%).

This compound is not described in the literature.

STEP B.—21-ACETOXY-16α-METHYL-Δ⁴,⁹⁽¹¹⁾-PREGNADIENE-17α-OL-3,20-DIONE 880 gm. of the compound produced in Step A were introduced into a mixture of 13.2 liters of acetone containing 1% water, 176 cc. of acetic acid and 1.32 kg. of potassium acetate. The mixture was refluxed under agitation while bubbling nitrogen therethrough in the absence of light. The steroid dissolved rapidly and the solution took on a reddish-orange color. The refluxing was continued for one hour and a half, then 1.5 liters of water were added and a part of the acetone was distilled off under vacuum. Water was re-added, the solution was cooled and 16α-methyl-21-acetoxy-Δ⁴,⁹⁽¹¹⁾-pregnadiene-17α-ol-3,20-dione was vacuum filtered. After washing with water and drying, 620 gm. of product were obtained which were purified by solution in acetic acetone and treatment in the hot by powdered zinc. After cooling and adding water, the solution was vacuum filtered, the filter cake washed with water and dried to recover 435 gm. (being 75% by reference to the starting material of the example) of 21-acetoxy-16α-methyl-Δ⁴,⁹⁽¹¹⁾-pregnadiene-17α-ol-3,20-dione which melted at 207–208° C. and had a specific rotation $[\alpha]_D^{20} = +99°$ ($c=0.5\%$ in chloroform). This product was identical to that described by Sarett et al (J. Am. Chem. Soc., 1958, 80, 3160).

Various modifications of the process and products of the present invention may be made without departing from the spirit or scope thereof, and it is to be understood that the invention be limited only as defined in the appended claims.

We claim:

1. A process for the preparation of 16α-methyl-Δ⁴,⁹⁽¹¹⁾-pregnadiene-17α-ol-3,20-dione which comprises bromooxidizing 16α-methyl-pregnane-3α,17α-diol-11,20-dione to form 4-bromo-16α-methyl-pregnane-17α-ol-3,11,20-trione, dehydrobrominating said 4-bromo-pregnane to form 16α-methyl-Δ⁴-pregnene-17α-ol-3,11,20 - trione, ketalizing the latter to form 3,20-diketal-16 -methyl-Δ⁵-pregnene-17α-ol-11-one, reducing said diketal to form 3,20-diketal-16α-methyl-Δ⁵-pregnene-11β,17α-diol, dehydrating said diol to form 3,20-diketal-16α-methyl-Δ⁵,⁹⁽¹¹⁾-pregnadiene-17α-ol, hydrolyzing the latter under acidic conditions to form 16α-methyl-Δ⁴,⁹⁽¹¹⁾-pregnadiene-17α-ol-3,20-dione and recovering the latter.

2. The process of claim 1 wherein the bromo-oxidation is effected with N-bromosuccinimide in t-butanol.

3. The porcess of claim 1 wherein the dehydrobromination is effected with a mixture of lithium bromide and lithium carbonate.

4. The process of claim 1 wherein the ketalization is effected with ethylene glycol and p-toluene sulfonic acid.

5. The process of claim 1 wherein the reduction is effected with potassium borohydride.

6. The process of claim 1 wherein the dehydration is effected with an alkyl sulfonyl chloride.

7. The porcess of claim 1 wherein the hydrolysis is effected with aqueous acetic acid.

8. A process for the preparation of 16α-methyl-Δ⁴,⁹⁽¹¹⁾-pregnadiene-17α-ol-3,20-dione which comprises treating 16α-methyl-pregnane-3α,17α-diol - 11,20 - dione with N-bromosuccinimide in t-butanol to form 4-bromo-16α-methyl-pregnane-17α-ol-3,11,20-trione, dehydrobrominating said 4-bromo-pregnane with a mixture of lithium bromide and lithium carbonate to form 16α-methyl-Δ⁴-pregnene-17α-ol-3,11,20-trione, reacting the latter with ethylene glycol and p-toluene sulfonic acid to form 3,20-bis-ethylene dioxy-16α-methyl-Δ⁵-pregnene-17α-ol-11-one, reducing the latter with an alkali metal borohydride to form 3,20-bis-ethylene dioxy-16α-methyl-Δ⁵-pregnene-11β,17α-diol, treating the latter with an alkyl sulfonyl chloride to form 3,20-bis-ethylene dioxy-16α-methyl-Δ⁵,⁹⁽¹¹⁾-pregnadiene-17α-ol, hydrolyzing the latter with aqueous acetic acid to form 16α-methyl-Δ⁴,⁹⁽¹¹⁾-pregnadiene-17α-ol-3,20-dione and recovering the latter.

References Cited in the file of this patent

UNITED STATES PATENTS

| 2,888,472 | Muller et al. | May 26, 1959 |
| 2,930,804 | Fried | Mar. 29, 1960 |
| 3,009,935 | Cutler | Nov. 21, 1961 |

FOREIGN PATENTS

| 737,957 | Great Britain | Oct. 5, 1955 |

OTHER REFERENCES

Bowers et al.: JACS, Vol. 80, pp. 3091–3093 (1958).
Arth et al.: JACS, Vol. 80, pp. 3160–3161 (1958).
Bernstein et al.: JACS, Vol. 81, pp. 4956–4962 (1959).

UNITED STATES PATENT OFFICE
CERTIFICATE OF CORRECTION

Patent No. 3,052,696                  September 4, 1962

Robert Joly et al.

It is hereby certified that error appears in the above numbered patent requiring correction and that the said Letters Patent should read as corrected below.

Column 2, TABLE I, the right-hand formula should appear as shown below instead of as in the patent:

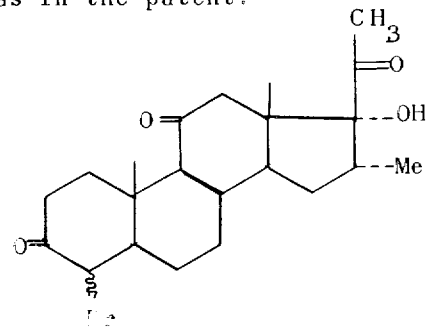

column 3, the first left-hand formula should appear as shown below instead of as in the patent:

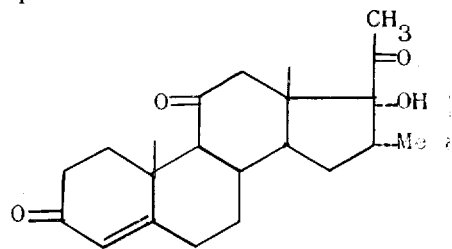

column 4, line 38, "$C_{11}$" read -- $C_{22}$ --; column 7, line 5, for "16" read -- $16_\alpha$ --; same column 7, line 14, for "parcess" read -- process --.

Signed and sealed this 26th day of March 1963.

(SEAL)
Attest:

ESTON G. JOHNSON                             DAVID L. LADD
Attesting Officer                        Commissioner of Patents